UNITED STATES PATENT OFFICE.

EUGENE M. LOUIS, OF HAVANA, ILLINOIS.

PROCESS OF MANUFACTURING DEXTRINE CORN-MALT.

SPECIFICATION forming part of Letters Patent No. 405,573, dated June 18, 1889.

Application filed November 15, 1888. Serial No. 290,942. (No specimens.)

*To all whom it may concern:*

Be it known that I, EUGENE M. LOUIS, a citizen of the United States, residing at Havana, in the county of Mason and State of Illinois, have invented a new and useful Improvement in the Process of Manufacturing Dextrine Corn-Malt, of which the following is a specification.

This invention relates to a process for producing corn-malt, designed to be used with or as a substitute for barley-malt; and it has for its object to produce a corn-malt which may be preserved in a dry portable state for an indefinite period.

The corn is first placed in a suitable tub or vat, and after being completely covered with water is allowed to soak a sufficient length of time to render the grains perfectly soft. The water is now drawn off, and the corn is allowed to remain undisturbed in the tub or vat, when, owing to the combined heat and moisture, it begins to sprout. When the sprouts have attained a length of from two-thirds to three-fourths of the length of the grain, the corn is removed and passed through a crusher, which preferably consists of a chilled roller operating in a chilled metallic cavity or depression. This reduces the corn to a meal which is somewhat coarser than ordinary cornmeal. The meal resulting from the last step, which is still moist, is now placed in a drying-kiln, to which a moderate heat is applied, and the meal is stirred steadily and continuously by suitable machinery. During the first portion of the drying process (about fifteen minutes, more or less) the meal is kept covered to retain the steam, thereby reducing the meal to a soft paste-like mass, after which the cover is removed and the mass is allowed to dry slowly. The corn is now removed from the kiln and passed through a heated drying-cylinder of the ordinary construction, thereby completing the drying process, after which it is spread out on a flat surface and allowed to cool. In this condition the meal may be kept an indefinite period without spoiling or losing its qualities. When thoroughly cooled, the meal is passed through a suitable grinder, then sifted and reground, thereby reducing it to the fineness of ordinary cornmeal. If it is desirable to remove the bran, the meal may now be passed through a sieve adapted for this purpose.

The advantages possessed by corn-malt produced as above described over barley-malt are, first, it possesses a larger percentage of carbohydrates, (starch, dextrine, sugar, &c.,) a smaller percentage of fiber and ash, and no torrefaction products whatever. Further, when used in connection with barley-malt, it accelerates fermentation and produces a clear bright color in the beer. Further, it increases the keeping qualities of the beer. When used with barley-malt, it may, if preferred, be treated therewith in the mash-tub.

I am aware that the process of malting corn as a substitute for barley is not new; also, that it is old to soften the corn before grinding; also, that it is old to soften and crush the grain before finally grinding, and also that it is old to steam the cornmeal before mashing, and I do not claim either of these steps, broadly. By crushing the maize-malt in a moist state before drying, it is reduced to a paste-like mass containing no perceptible hard particles, and the subsequent steaming completes the operation thus begun, and brings the mass into the proper condition to be dried by heat. The subsequent cooling, grinding, and air-drying simply brings the malt to a condition in which it may be preserved for subsequent use. Malt thus prepared need not be used immediately, but may be kept until needed.

Having thus described my invention, I claim—

1. The herein-described process for producing corn-malt, consisting in first soaking and sprouting the grain, then crushing in a moist state to a coarse meal, then steaming, and subsequently drying by heat, cooling, and grinding, and finally drying by exposure to the air, these steps occurring in the order mentioned.

2. In a process for producing corn-malt, the crushing in a moist state of the malted grain and the subsequent steaming thereof in a closed space prior to drying and grinding, substantially as and for the purpose specified.

In testimony that I claim the foregoing as my own I have hereto affixed my signature in presence of two witnesses.

EUGENE M. LOUIS.

Witnesses:
 C. E. COPPEL,
 H. R. NORTRUP.